J. N. BARTLE.
VEHICLE WHEEL.
APPLICATION FILED OCT. 28, 1910.
1,012,796.
Patented Dec. 26, 1911.
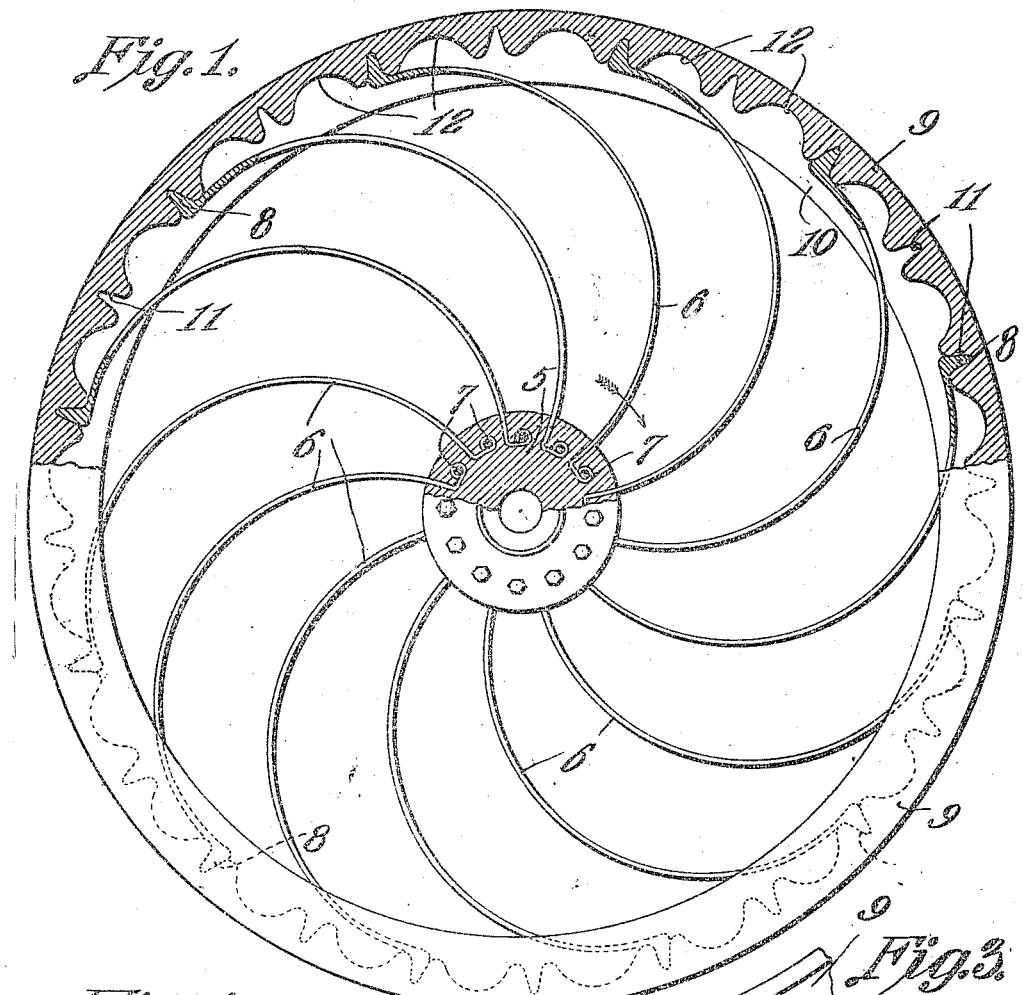
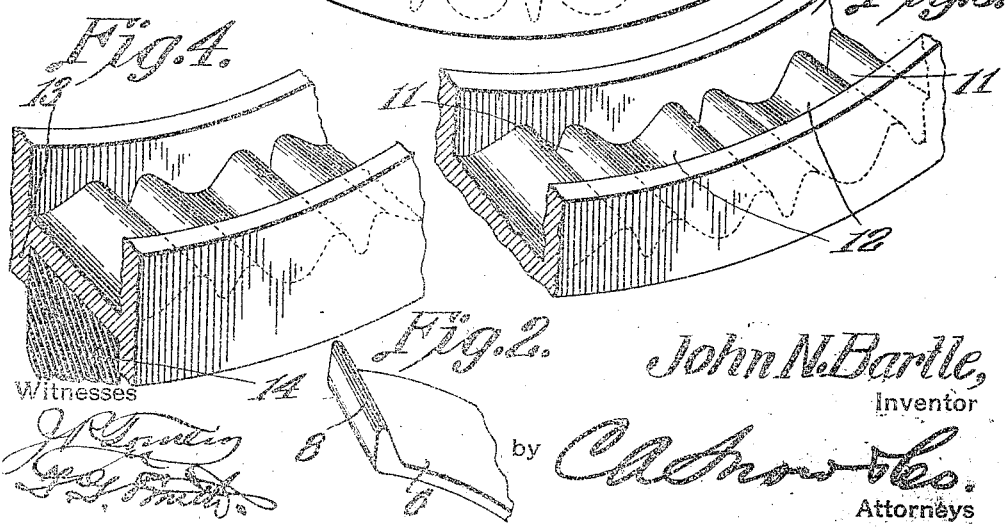
John N. Bartle,
Inventor

UNITED STATES PATENT OFFICE.

JOHN N. BARTLE, OF WICHITA FALLS, TEXAS.

VEHICLE-WHEEL.

1,012,796.

Specification of Letters Patent.  Patented Dec. 26, 1911.

Application filed October 28, 1910. Serial No. 589,639.

*To all whom it may concern:*

Be it known that I, JOHN N. BARTLE, a citizen of the United States, residing at Wichita Falls, in the county of Wichita and State of Texas, have invented a new and useful Vehicle-Wheel, of which the following is a specification.

It is the object of the present invention to provide an improved construction of vehicle wheel and the invention relates more particularly to that class of such wheels which embody a hub, a rim, and resilient spokes interposed between the hub and the rim.

One aim of the present invention is to provide a wheel of the type mentioned so constructed that the hub and spokes may revolve independently of the rim under certain conditions. A wheel so constructed, obviates the employment of compensating gearing and also provides against the drive axle or the wheel hub being subjected to abnormal stress when the vehicle which the wheel supports, is suddenly started or stopped.

Briefly stated, the invention contemplates the provision of a vehicle wheel in which the spokes do not have rigid or positive connection with the rim but merely frictionally engage with the same.

In the accompanying drawings, Figure 1 is a view partly in elevation and partly in vertical section, of a wheel constructed in accordance with the present invention. Fig. 2 is a perspective of the outer end portion of one of the wheel spokes. Fig. 3 is a similar view of a portion of the wheel rim. Fig. 4 is a view similar to Fig. 3 illustrating a slight modification of the rim.

In the drawings, the wheel hub is indicated by the numeral 5 and may be of any desired form. The spokes of the wheel are indicated by the numeral 6 and are of flat resilient metal, they being rigidly secured as at 7. at their inner ends, in the hub 5. Each spoke 6, at its outer end, is formed with a transverse tooth 8 the function of which tooth will be presently fully explained. It will be observed that the spokes, when properly assembled in the completed wheel, are bowed between their ends, their convex sides being presented in the direction of rotation of the wheel.

The wheel rim, in the form of the invention shown in Figs. 1 and 3 of the drawings, embodies also the tire of the wheel and is indicated by the numeral 9. This rim has inwardly projecting flanges 10 at each side and between these flanges the outer ends of the spokes engage and are held, the spokes being held against lateral displacement at their said outer ends by reason of such engagement between the flanges. The rim 9 upon its inner peripheral surface is formed with a plurality of sockets 11 and between each two sockets with a depression or concavity 12, the concavity 12 being preferably much wider than the sockets 11.

It will be observed from an inspection of Fig. 1 of the drawings that in assembling the hub and the spokes with the rim, the outer ends of the spokes are disposed between the flanges 10 of the rim with the transverse teeth 8 seating in the sockets 11. Not all of the sockets are occupied by the teeth 8, only every other one of the said sockets being so occupied in Fig. 1 of the drawings. Furthermore it will be understood that the engagement of the teeth in the sockets is purely a frictional and loose engagement and that should the wheel hub be suddenly rapidly rotated in the direction indicated by the arrow in Fig. 1 of the drawings, the toothed outer ends of the spokes will leave the sockets which they occupy in Fig. 1 and will ride over the depression next adjacent thereto and into the next one of the said sockets or in the one following that one, or in fact, the spokes may ride over a number of the sockets before the speed of rotation of the hub is normal. Thus, due to the fact that the spokes have only frictional engagement with the rim, the wheel hub is not subjected to abnormal stress due to sudden starting or stopping of the vehicle supported by the wheel. Furthermore, it will be readily understood that a pair of these wheels on the drive axle of a vehicle, such as an automobile, will obviate the employment of compensating gearing inasmuch in turning a corner, the hub and spokes of the inner wheel will rotate within the rim thereof to compensate for the extra distance traveled by the outer wheel. Should the hub, however, have the brakes applied or the motion be transmitted in the opposite direction to the arrow, the teeth 8, and their spring spokes, will act with the sockets 11, similarly to a pawl and ratchet, and will thus be held tightly in the sockets 11 and cause the rim 9 to be firmly attached to and rotatable with the hub. While, as stated above, in the form of wheel shown in Figs. 1 and 3 of the drawing, the rim 9 embodies the tire of the wheel, in the form shown in Fig. 4 of the drawing, the wheel rim is formed upon its outer periphery and sides with an outwardly projecting flange 13 and between these flanges is fitted a tire 14 which may be of any desired structure.

What is claimed is:

1. In a wheel, a rim, a hub, and spokes carried by the hub, the rim being formed with spaced flanges, and the curved spring spokes seating at their outer ends between the flanges and frictionally engaging the rim between the flanges and forming a pawl and ratchet connecting means therebetween.

2. In a wheel, a hub, curved spring spokes carried by the hub, and a rim formed with a plurality of sockets frictionally receiving the outer ends of the spokes and adapted to form a pawl and ratchet connection therewith.

3. In a wheel, a hub, a series of curved spring spokes carried by the hub, and a rim supported at the ends of the spokes and movable thereabout in one direction, the said rim being held normally in a positive manner against rotation in the opposite direction about the spokes and independently thereof.

4. In a wheel, a rim formed with a plurality of sockets, a hub, and a series of curved spring spokes carried by the hub and having at their outer ends teeth frictionally seating in the sockets and forming a pawl and ratchet connection between the spokes and rim.

In testimony that I claim the foregoing as my own, I have hereto affixed my signature in the presence of two witnesses.

JOHN N. BARTLE.

Witnesses:
ROBERT E. HUFF,
LAULA MCBRIDE.